US012676438B2

(12) United States Patent
Tanigawa

(10) Patent No.: US 12,676,438 B2
(45) Date of Patent: Jul. 7, 2026

(54) ELECTRICAL CONNECTOR DEVICE, RECEPTACLE CONNECTOR, AND PLUG CONNECTOR

(71) Applicant: I-PEX Inc., Kyoto (JP)

(72) Inventor: Tomohiko Tanigawa, Ogori (JP)

(73) Assignee: I-PEX Inc., Kyoto (JP)

( * ) Notice: Subject to any disclaimer, the term of this patent is extended or adjusted under 35 U.S.C. 154(b) by 356 days.

(21) Appl. No.: 18/430,451

(22) Filed: Feb. 1, 2024

(65) Prior Publication Data

US 2024/0266770 A1 Aug. 8, 2024

(30) Foreign Application Priority Data

Feb. 2, 2023 (JP) ................................. 2023-014813

(51) Int. Cl.

*H01R 13/11* (2006.01)
*H01R 12/71* (2011.01)
*H01R 13/05* (2006.01)
*H01R 13/502* (2006.01)
(Continued)

(52) U.S. Cl.

CPC ........... *H01R 13/11* (2013.01); *H01R 12/716* (2013.01); *H01R 13/05* (2013.01); *H01R 13/502* (2013.01); *H01R 13/6471* (2013.01); *H01R 13/6581* (2013.01)

(58) Field of Classification Search

CPC ...... H01R 13/11; H01R 12/716; H01R 13/05; H01R 13/502; H01R 13/6471; H01R 13/6581; H01R 13/6582; H01R 12/775; H01R 12/79; H01R 13/6594; H01R 13/6591; H01R 13/40; H01R 24/00

See application file for complete search history.

(56) References Cited

U.S. PATENT DOCUMENTS 9,893,448 B2 * 2/2018 Mashima ............. H01R 12/774
12,537,344 B2 * 1/2026 Hou ................... H01R 13/6585
2012/0100743 A1 4/2012 Ohsaka
(Continued)

FOREIGN PATENT DOCUMENTS

EP 2590272 B1 * 5/2014 ........... H01R 13/639
JP 2004-259672 A 9/2004
(Continued)

OTHER PUBLICATIONS

Decision of Dismissal of Amendment and Decision of Rejection dated May 20, 2025, issued for the corresponding JP Patent Application No. 2023-014813 and the English translation.
(Continued)

*Primary Examiner* — Seung H Lee
(74) *Attorney, Agent, or Firm* — Howard & Howard Attorneys PLLC

(57) ABSTRACT

The conductive member (3) is arranged in such a manner as to surround a facing area facing the second connector (4) to be fitted to the first connector (2) within a mounting surface (5*a*) of the board (5) along the mounting surface (5*a*) in conjunction with the receptacle shell (22). The second connector (4) includes a conductive first shell (43) arranged in such a manner as to, when being fitted to the first connector (2), come into contact with the receptacle shell
(Continued)

(22) and the conductive member (3) and cover the receptacle terminals (21) in conjunction with the receptacle shell (22) and the conductive member (3).

9 Claims, 9 Drawing Sheets

(51) Int. Cl.
*H01R 13/6471* (2011.01)
*H01R 13/6581* (2011.01)

(56) References Cited

U.S. PATENT DOCUMENTS

| | | | | |
|---|---|---|---|---|
| 2012/0252252 | A1 | 10/2012 | Yamaji | |
| 2015/0132985 | A1 | 5/2015 | Choi et al. | |
| 2016/0308308 | A1* | 10/2016 | Masunaga | H01R 13/6275 |
| 2017/0033505 | A1 | 2/2017 | Ozeki | |
| 2018/0342838 | A1 | 11/2018 | Ozeki | |
| 2019/0305487 | A1 | 10/2019 | Ozeki | |
| 2021/0005990 | A1 | 1/2021 | Zhang et al. | |
| 2021/0091512 | A1 | 3/2021 | Ozeki | |
| 2022/0360022 | A1 | 11/2022 | Ozeki | |
| 2024/0014605 | A1 | 1/2024 | Ozeki | |

FOREIGN PATENT DOCUMENTS

| | | | |
|---|---|---|---|
| JP | 2009-117289 | A | 5/2009 |
| JP | 2012-089435 | A | 5/2012 |
| JP | 2012209079 | A | 10/2012 |
| JP | 2015-095447 | A | 5/2015 |
| JP | 2017-033909 | A | 2/2017 |
| JP | 2018-139175 | A | 9/2018 |
| JP | 2021-009836 | A | 1/2021 |
| JP | 2022-171889 | A | 11/2022 |

OTHER PUBLICATIONS

Japanese Office Action dated Jul. 30, 2024, issued for the corresponding JP Patent Application No. 2023-014813 and the English Translation.

Japanese Office Action dated Dec. 3, 2024, issued for the corresponding JP Patent Application No. 2023-014813 and the English Translation.

* cited by examiner

ELECTRICAL CONNECTOR DEVICE, RECEPTACLE CONNECTOR, AND PLUG CONNECTOR

CROSS-REFERENCE TO RELATED APPLICATIONS

This application claims the benefit of Japanese Patent Application No. 2023-014813, filed on Feb. 2, 2023, the entire disclosure of which is incorporated by reference herein.

FIELD OF THE INVENTION

This application relates to an electrical connector device, a receptacle connector, and a plug connector.

BACKGROUND OF THE INVENTION

An inter-engaging connector device disclosed in Unexamined Japanese Patent Application Publication No. 2018-139175 includes a receptacle connector connected to a board and a plug connector connected to coaxial cables and fitted to the receptacle connector in the normal direction of a mounting surface of the board.

Board connecting portions (indicated by a reference sign 19*a* in FIG. 7) of contacts in the receptacle connector are exposed to the outside. Therefore, there is a possibility that electromagnetic noise leaks at the time of energization, and improvement in shielding performance against electromagnetic noise is expected.

The present disclosure has been made in consideration of the above-described circumstances, and an objective of the present disclosure is to provide an electrical connector device, a receptacle connector, and a plug connector capable of achieving electromagnetic shielding at board connecting portions of contacts.

SUMMARY OF THE INVENTION

An electrical connector device according to a first aspect of the present disclosure includes: a first connector mounted on a board; a conductive member grounded to the board; and a second connector connected to a signal line and configured to, when being fitted to the first connector, electrically connect the signal line and the board to each other, in which the first connector includes: a plurality of conductive receptacle terminals each including a board connecting portion to electrically connect to the board and configured to, when the first connector and the second connector are fitted to each other, electrically connect to the signal line via the second connector; and a conductive receptacle shell grounded to the board and configured to cover at least some receptacle terminals among the plurality of receptacle terminals, the conductive member is arranged in such a manner as to surround a facing area, the facing area facing the second connector to be fitted to the first connector, within a mounting surface of the board along the mounting surface in conjunction with the receptacle shell, and the second connector includes a conductive plug shell arranged in such a manner as to, when being fitted to the first connector, come into contact with the receptacle shell and the conductive member and cover the receptacle terminals in conjunction with the receptacle shell and the conductive member.

In this case, the electrical connector device may be configured such that the conductive member is formed as a separate entity from the receptacle shell.

The electrical connector device may be configured such that a contact projecting piece that when the first connector and the second connector are fitted to each other, come into contact with the plug shell is formed on the conductive member.

The electrical connector device may be configured to include, as the receptacle terminals: a first receptacle terminal having the board connecting portion arranged in a first area within the facing area; and a second receptacle terminal having the board connecting portion arranged in a second area different from the first area within the facing area, in which the receptacle shell is arranged close to the first area, and the conductive member is arranged close to the second area.

The electrical connector device may be configured such that the board connecting portion of the second receptacle terminal that is arranged in the second area projects toward the conductive member from the receptacle shell.

The electrical connector device may be configured such that a first engagement portion is formed on the receptacle shell, and a second engagement portion that engages with the first engagement portion when the first connector and the second connector are fitted to each other is formed on the plug shell.

A receptacle connector according to a second aspect of the present disclosure is a receptacle connector fitted to a plug connector including: a plurality of conductive plug terminals connected to a plurality of signal lines in a one-to-one manner; and a conductive plug shell to cover at least some plug terminals among the plurality of plug terminals, and includes: a plurality of conductive receptacle terminals each including a board connecting portion to electrically connect to a board; a conductive receptacle shell to cover at least some receptacle terminals among the plurality of receptacle terminals, the receptacle shell being grounded to the board; and a conductive member grounded to the board and arranged in such a manner as to surround a facing area, the facing area facing the plug connector to be fitted to the receptacle connector, within a mounting surface of the board along the mounting surface in conjunction with the receptacle shell, in which when the receptacle connector is fitted to the plug connector, the receptacle terminals come into contact with the plug terminals in a one-to-one manner, and the receptacle shell and the conductive member are arranged in such a manner as to come into contact with the plug shell and cover the board connecting portions in conjunction with the plug shell.

The receptacle connector may be configured to include, as the receptacle terminals: a first receptacle terminal having the board connecting portion arranged in a first area within the facing area; and a second receptacle terminal having the board connecting portion arranged in a second area different from the first area within the facing area, in which the receptacle shell is arranged close to the first area, the conductive member is arranged close to the second area, and the board connecting portion of the second receptacle terminal that is arranged in the second area projects toward the conductive member from the receptacle shell.

A plug connector according to a third aspect of the present disclosure is a plug connector fitted to a receptacle connector including: a plurality of conductive receptacle terminals each including a board connecting portion to electrically connect to a board; a conductive receptacle shell grounded to the board and configured to cover at least some receptacle terminals among the plurality of receptacle terminals; and a conductive member grounded to the board and mounted in adjacency to the receptacle shell, and includes: a plurality of conductive plug terminals connected to a plurality of signal lines in a one-to-one manner; and a conductive plug shell to cover at least some plug terminals among the plurality of plug terminals, in which when the receptacle connector is fitted to the plug connector, the plug terminals come into contact with the receptacle terminals in a one-to-one manner, and the plug shell is arranged in such a manner as to come into contact with the receptacle shell, project toward the conductive member and come into contact with the conductive member, and cover the receptacle terminals in conjunction with the receptacle shell and the conductive member.

According to the present disclosure, electromagnetic shielding at board connecting portions of contacts can be achieved.

BRIEF DESCRIPTION OF DRAWINGS

A more complete understanding of this application can be obtained when the following detailed description is considered in conjunction with the following drawings, in which.

DETAILED DESCRIPTION OF THE INVENTION

Figure 1:
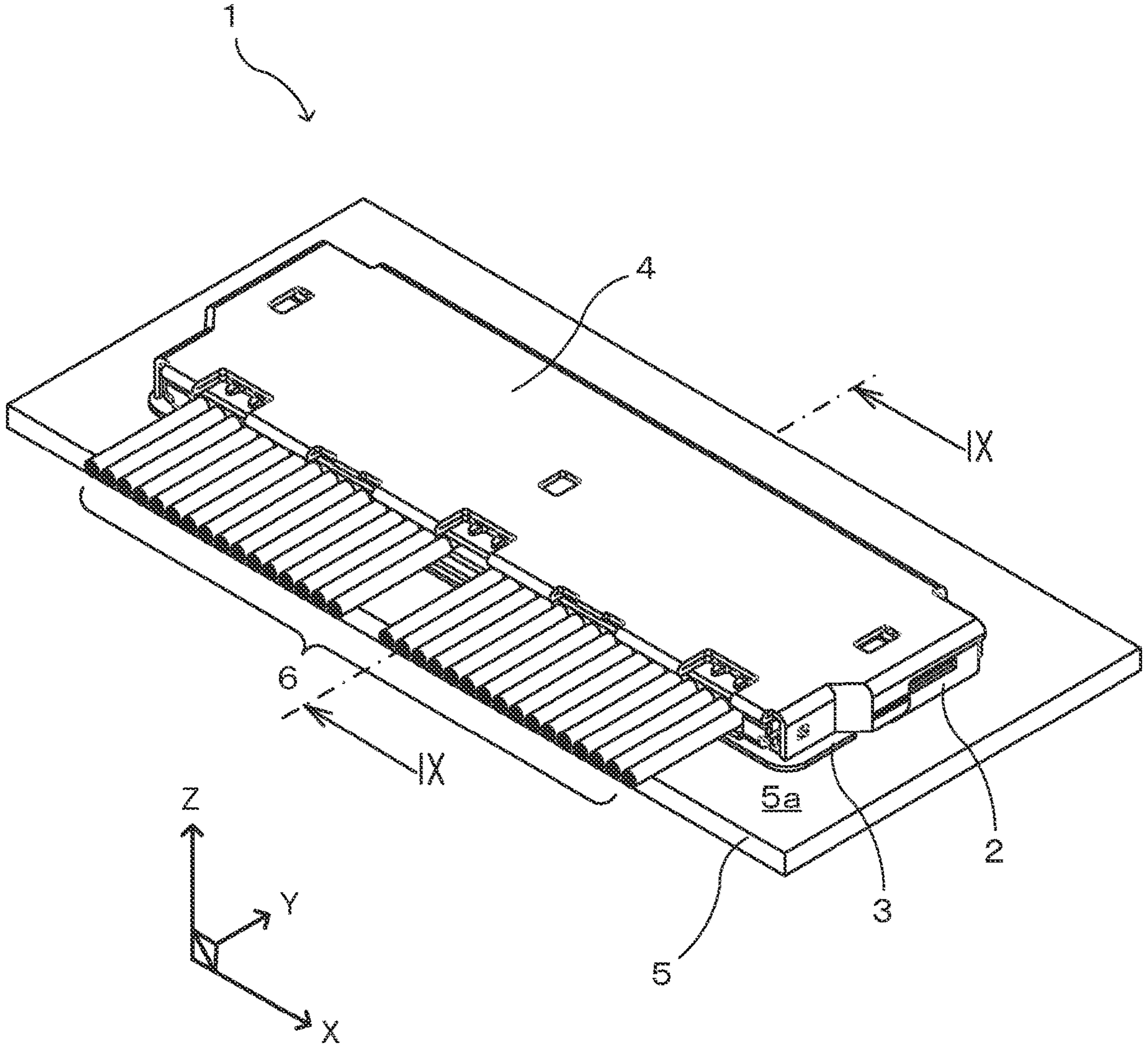
FIG. 1 is a perspective view of an electrical connector device according to one embodiment of the present disclosure.

The embodiment of the present disclosure is described below in detail with reference to the drawings. In the drawings, the same or equivalent parts are designated by the same reference numerals. In the present embodiment, description is made appropriately using a three axis Cartesian coordinate system defined by XYZ axes illustrated in the drawings.

Figure 2:
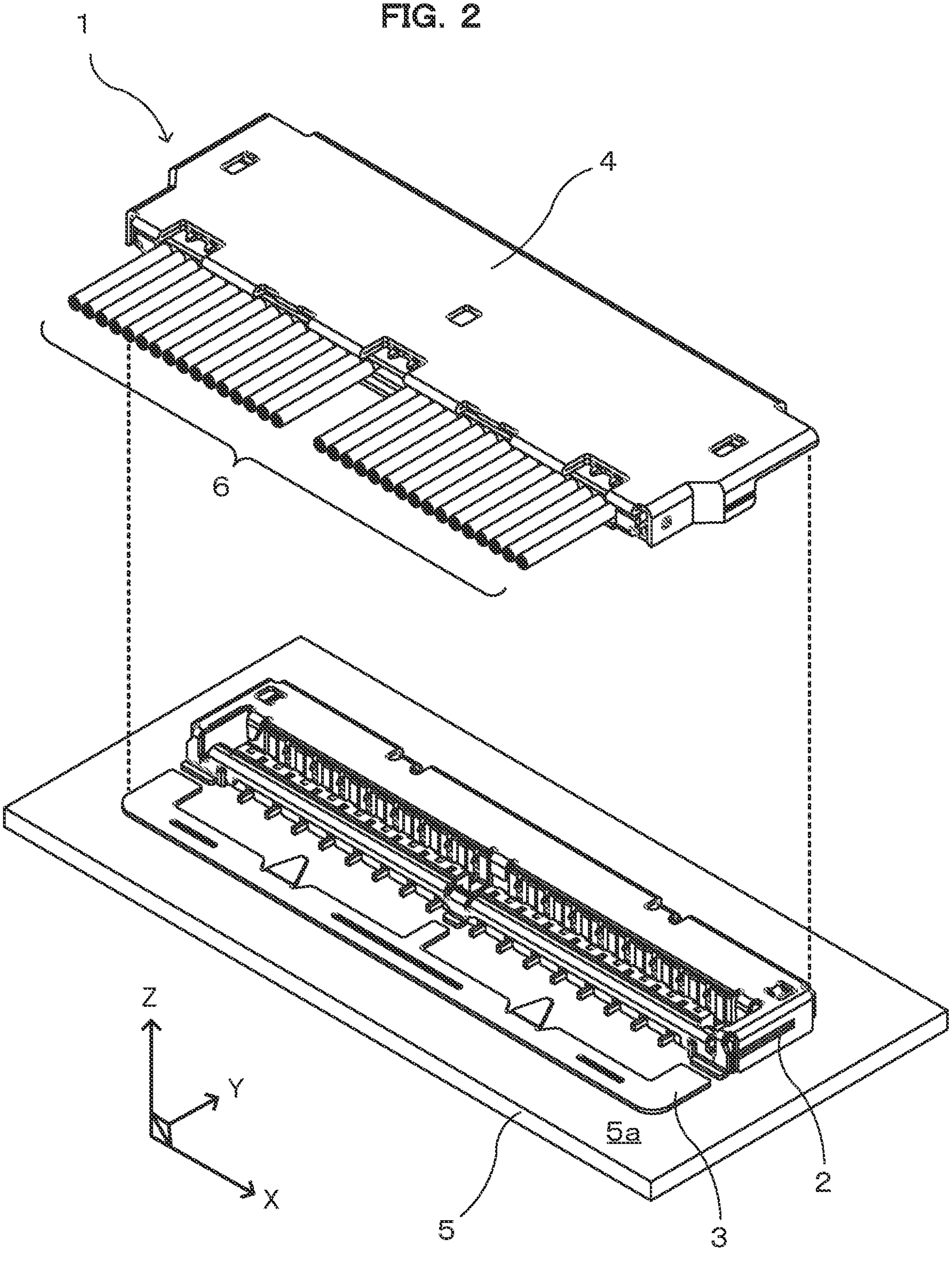
FIG. 2 is a perspective view of a first connector and a second connector constituting the electrical connector device in FIG. 1.

As illustrated in FIGS. 1 and 2, an electrical connector device 1 according to the present embodiment includes a first connector 2, a conductive member 3, and a second connector 4. When viewed from a different angle, the electrical connector device 1 according to the present embodiment can be configured to include a receptacle connector including the first connector 2 and the conductive member 3 and a plug connector that is the second connector 4.

The first connector 2 is mounted on a board 5. The conductive member 3 is mounted on the board 5 in adjacency to the first connector 2 and is grounded to the board 5. The second connector 4 is connected to electrical cables 6 serving as signal lines.

[Board]

The board 5 is, for example, a printed wiring board or a flexible printed board on which an electronic circuit or electronic components are mounted and is housed in, for example, an electronic device. The first connector 2 is connected to a not-illustrated signal electrode and ground electrode that are formed on a mounting surface 5*a* of the board 5, by solder connection or the like. The conductive member 3 is connected to a ground electrode that is formed on the mounting surface 5*a* of the board 5, by solder connection or the like.

In the present embodiment, it is assumed that the mounting surface 5*a* of the board 5 is parallel with an XY plane. Therefore, the normal direction of the mounting surface 5*a* coincides with a Z-axis direction. In the present embodiment, description is made appropriately assuming that a plane parallel with the XY plane is a "horizontal plane", a +Z-direction is an "upward" direction, and a −Z-direction is a "downward" direction.

[Electrical Cable]

Figure 3:
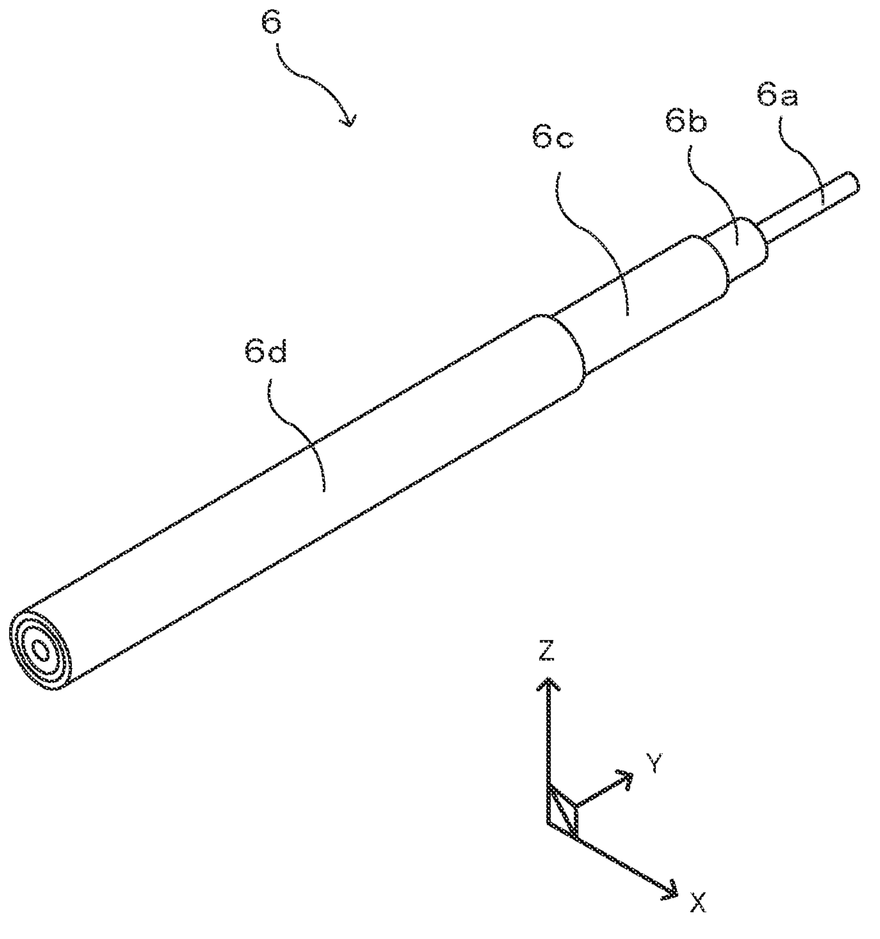
FIG. 3 is a perspective view illustrating a portion of a coaxial cable.

The electrical cables 6 are used to transmit electrical signals between boards 5 housed in the electronic device. In the present embodiment, the electrical cables 6 are coaxial cables. Each of the electrical cables 6 includes an inner conductor 6*a*, an insulator 6*b*, an outer conductor 6*c*, and a protective film 6*d*, as illustrated in FIG. 3. The inner conductor 6*a* is formed by a metal wire (for example, a copper wire) that extends in a linear shape. The insulator 6*b* covers a circumferential surface of the inner conductor 6*a*. The outer conductor 6*c* is formed by metal braided wire that is formed in a cylindrical shape and covers a circumferential surface of the insulator 6*b*. The protective film 6*d* covers a circumferential surface of the outer conductor 6*c*. The electrical cable 6 enables signal transmission by a potential difference between the inner conductor 6*a* and the outer conductor 6*c*.

As illustrated in FIG. 2, the first connector 2 and the second connector 4 are configured to be able to be fitted and removed to and from each other in the normal direction of the mounting surface 5*a* of the board 5 (the Z-axis direction). As illustrated in FIG. 1, fitting the first connector 2 and the second connector 4 to each other causes the board 5 and the electrical cables 6 to be electrically connected and enables transmission of signals between an electrical circuit and electronic components on the board 5 and the electrical cables 6.

[First Connector]

First, detailed configuration of the first connector 2 is described. As illustrated in FIG. 2, the first connector 2 is a connector that has a long length in an X-axis direction and that is flat plate-shaped.

Figure 4:
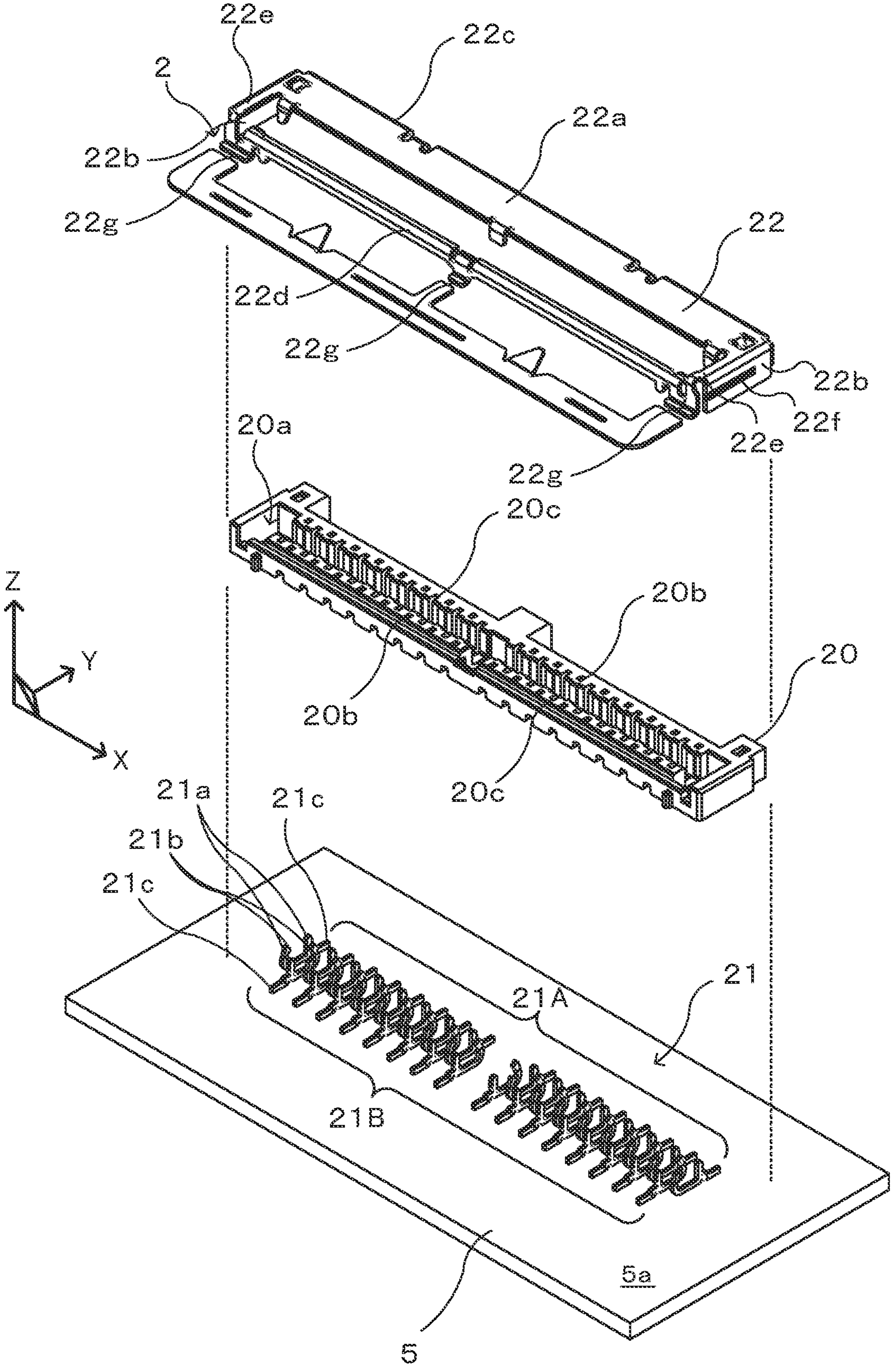
FIG. 4 is an exploded perspective view of the first connector.

As illustrated in FIG. 4, the first connector 2 is formed including a receptacle housing 20 that faces the board 5, a plurality of receptacle terminals 21, and a receptacle shell 22.

[Receptacle Housing]

The receptacle housing 20 forms a base of the first connector 2. The receptacle housing 20 has a rectangular outer shape and has a longitudinal direction aligned with the X-axis direction. The receptacle housing 20 is formed of an insulating material containing resin.

The receptacle housing 20 holds the plurality of receptacle terminals 21 that are arranged in parallel with one another in the X-axis direction while being covered by the receptacle shell 22. The receptacle housing 20 is interposed between the receptacle terminals 21 and the receptacle shell 22 and insulates the receptacle terminals 21 and the receptacle shell 22 from each other.

On the upper surface facing in the +Z-direction of the receptacle housing 20, a recessed portion 20*a* that houses a protruding portion 40*a* of a plug housing 40 of the second connector 4 (see FIG. 8) is formed. An opening of the recessed portion 20*a* extends in the X-axis direction that is the longitudinal direction of the receptacle housing 20.

In addition, in the receptacle housing 20, through-holes 20*b* into each of which one of the receptacle terminals 21 is inserted are formed. The through-holes 20*b* are arranged at a predetermined pitch in the X-axis direction in a vicinity of the opening of the recessed portion 20*a*. A row of through-holes 20*b* is formed on each of both sides in a Y-axis direction of the recessed portion 20*a*. One row of through-holes 20*b* and the other row of through-holes 20*b* are formed with positions of the one row shifted from positions of the other row by half of an arrangement cycle in the X-axis direction.

In addition, on two inner wall surfaces along the X-axis direction of the recessed portion 20*a* of the receptacle housing 20, arrangements of grooves in which groove portions 20*c* extending in the Z-axis direction are arranged in the X-axis direction are formed. Each of groove portions 20*c* formed on one inner wall surface is formed at the same position in the X-axis direction as a position at which one of through-holes 20*b* formed close to the other inner wall surface is formed. In addition, each of groove portions 20*c* formed on the other inner wall surface is formed at the same position in the X-axis direction as a position at which one of through-holes 20*b* formed close to the one inner wall surface is formed.

[Receptacle Terminal]

Figure 5A:
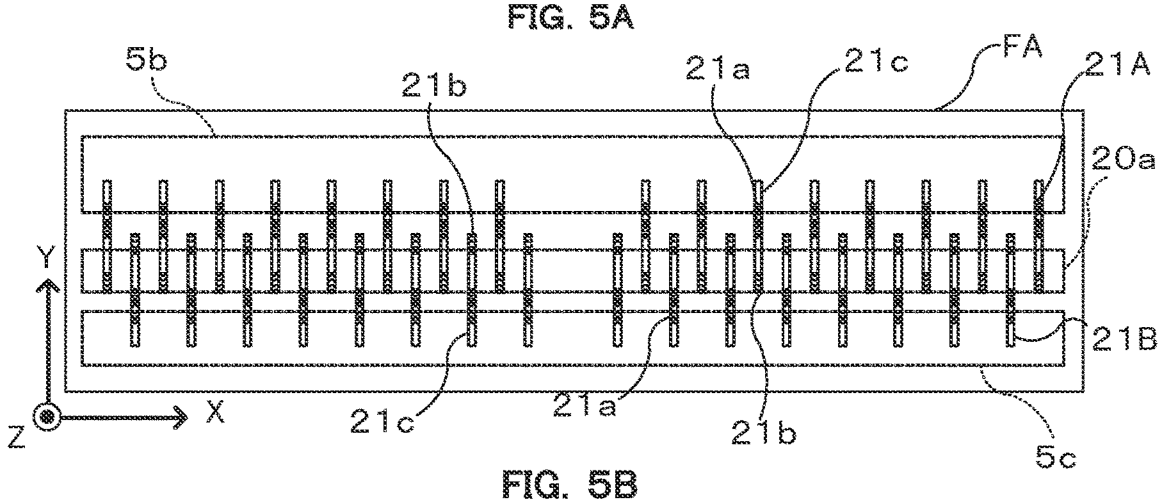
FIG. 5A is a diagram illustrating an arrangement of receptacle terminals.

The plurality of receptacle terminals 21 is, for example, conductive members that are formed by blanking a metal plate-shaped member having elastic force. As illustrated in FIG. 4, in each of the receptacle terminals 21, a locking portion 21*a*, a contact portion 21*b*, and a board connecting portion 21*c* are formed. Each of the receptacle terminals 21 has the locking portion 21*a* thereof inserted into one of the through-holes 20*b* (see FIG. 4) upward from below while, as illustrated in FIG. 5A, being arranged in line in such a manner that the plate thickness direction thereof coincides with the X-axis direction. Because of this configuration, the receptacle terminals 21 are fixedly held by the receptacle housing 20.

When each of the receptacle terminals 21 is fixed to the receptacle housing 20, the contact portion 21*b* is brought into a state of projecting into the recessed portion 20*a* of the receptacle housing 20. When the protruding portion 40*a* of the plug housing 40 of the second connector 4 (see FIG. 8) is fitted into the recessed portion 20*a*, the contact portion 21*b* is pressed by one of plug terminals 41 that are disposed on the protruding portion 40*a* and is displaced in one of the groove portions 20*c* formed on an inner wall surface, and is electrically connected to the plug terminal 41 in a one-to-one manner (see FIG. 9B).

In addition, when the receptacle terminals 21 are fixed to the receptacle housing 20, the board connecting portions 21*c* are brought into a state of being arranged along the mounting surface 5*a*, as illustrated in FIG. 4.

As described above, inserting the receptacle terminals 21 into the receptacle housing 20 causes two rows of receptacle terminals 21 that are arranged in the X-axis direction to be formed, as illustrated in FIG. 5A. An area on the mounting surface 5*a* of the board 5 in which the rows of receptacle terminals 21 are mounted and that faces the second connector 4 fitted to the first connector 2 is also referred to as a facing area FA that faces the second connector 4. In the facing area FA, receptacle terminals 21 in one terminal row and receptacle terminals 21 in the other terminal row point in the opposite direction along the Y-axis direction. Because of this configuration, the board connecting portions 21*c* of receptacle terminals 21 that have the locking portions 21*a* inserted into one row of through-holes 20*b* and that are fixed to the receptacle housing 20 and the board connecting portions 21*c* of receptacle terminals 21 that have the locking portions 21*a* inserted into the other row of through-holes 20*b* are arranged in such a manner as to extend in the opposite direction to each other in the mounting surface 5*a*.

Figure 5B:
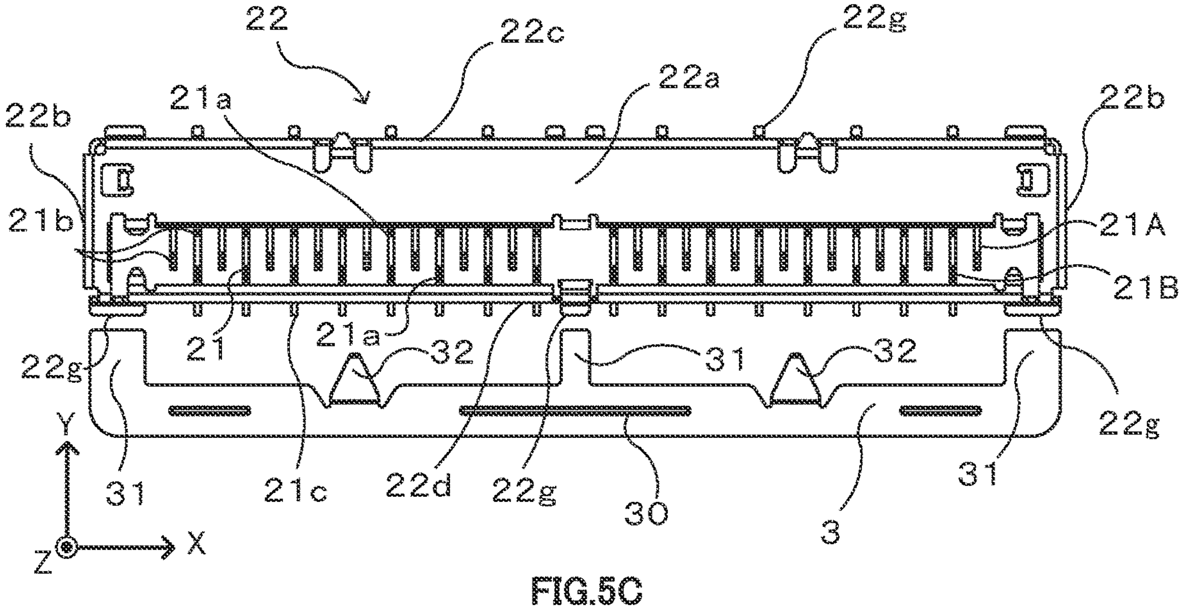
FIG. 5B is a top view of the receptacle terminals, a receptacle shell, and a conductive member.
Figure 5C:
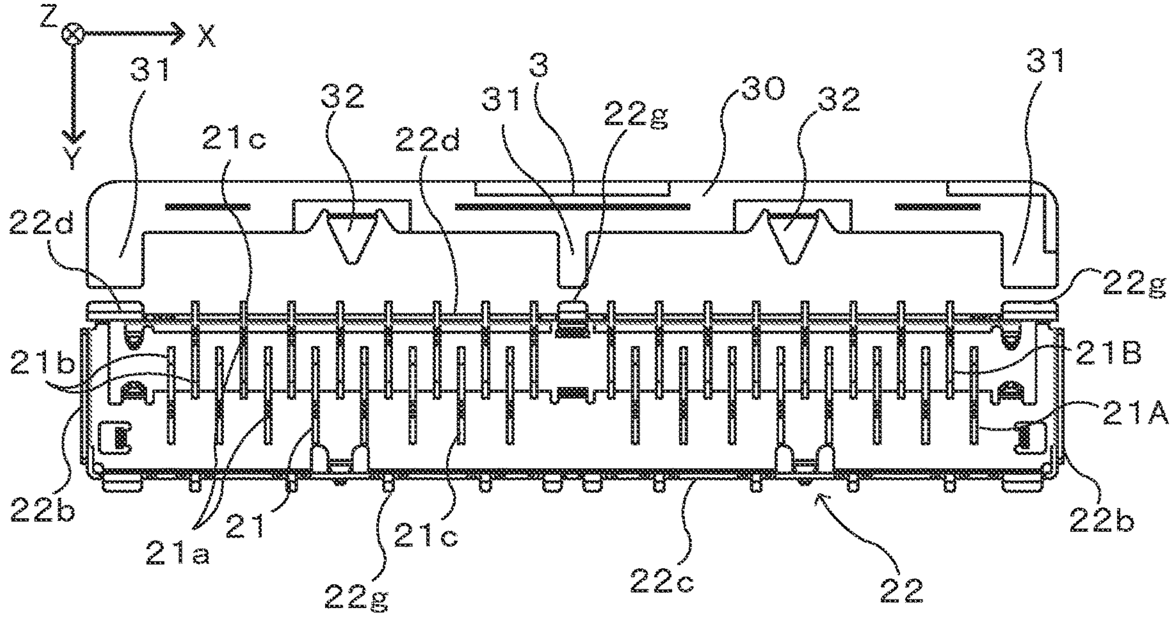
FIG. 5C is a bottom view of the receptacle terminals, the receptacle shell, and the conductive member.

As illustrated in FIG. 5A, receptacle terminals 21 that have the board connecting portions 21*c* arranged in a first area 5*b* that is located close to a +Y side within the facing area FA on the mounting surface 5*a* (see FIG. 4) are defined as first receptacle terminals 21A. In addition, receptacle terminals 21 that have the board connecting portions 21*c* arranged in a second area 5*c* that is different from the first area 5*b* and that is located close to a −Y side within the facing area FA on the mounting surface 5*a* are defined as second receptacle terminals 21B. That is, the first connector 2 includes, as the receptacle terminals 21, the first receptacle terminals 21A that have the board connecting portions 21*c* located in the first area 5*b* on the mounting surface 5*a* of the board 5 and the second receptacle terminals 21B that have the board connecting portions 21*c* located in the second area 5*c* on the mounting surface 5*a* of the board 5. As illustrated in FIGS. 5B and 5C, the receptacle shell 22 is arranged close to the first area 5*b*, and the conductive member 3 is arranged close to the second area 5*c*. Note that FIGS. 5B and 5C are illustrated by omitting the receptacle housing 20 for the convenience of description.

In addition, as illustrated in FIG. 5A, the contact portions 21*b* of the receptacle terminals 21 in both terminal rows are arranged in such a manner as to face each other and project into the recessed portion 20*a*.

[Receptacle Shell]

The receptacle shell 22 is, for example, formed by a pressed metal plate-shaped member and has elasticity and conductivity. As illustrated in FIG. 4, the receptacle shell 22 includes an upper face portion 22*a* that covers an upper portion of the receptacle housing 20, a pair of side wall portions 22*b*, a side wall portion 22*c*, and a side wall portion 22*d*.

As illustrated in FIG. 4, the upper face portion 22*a* is a flat plate-shaped portion that is parallel with the XY plane in such a manner as to cover the upper surface of the receptacle housing 20. In the upper face portion 22*a*, an opening is formed in an area that faces the recessed portion 20*a* within the upper surface of the receptacle housing 20. At both ends in the X-axis direction of the upper face portion 22*a*, extended portions 22*e* that form edge portions extending in the Y-axis direction at both ends in the X-axis direction of the opening are formed.

The pair of side wall portions 22*b* are formed in such a manner as to be bent downward from edges at both ends in the X-axis direction of the upper face portion 22*a*, as illustrated in FIGS. 4, 5B, and 5C. Each of the side wall portions 22*b* is formed in parallel with a YZ plane. In a space surrounded by the upper face portion 22*a* and the pair of side wall portions 22*b*, the receptacle housing 20 is arranged. The pair of side wall portions 22*b* cover side walls at both ends in the X-axis direction of the receptacle housing 20. As illustrated in FIG. 4, on each of the side wall portions 22*b*, a recess-shaped first engagement portion 22*f* that engages with one of second engagement portions 43*d* (see FIG. 7) of the second connector 4 when the first connector 2 is fitted to the second connector 4 is formed. The first engagement portion 22*f* may be formed in a protruding shape.

Figure 9A:
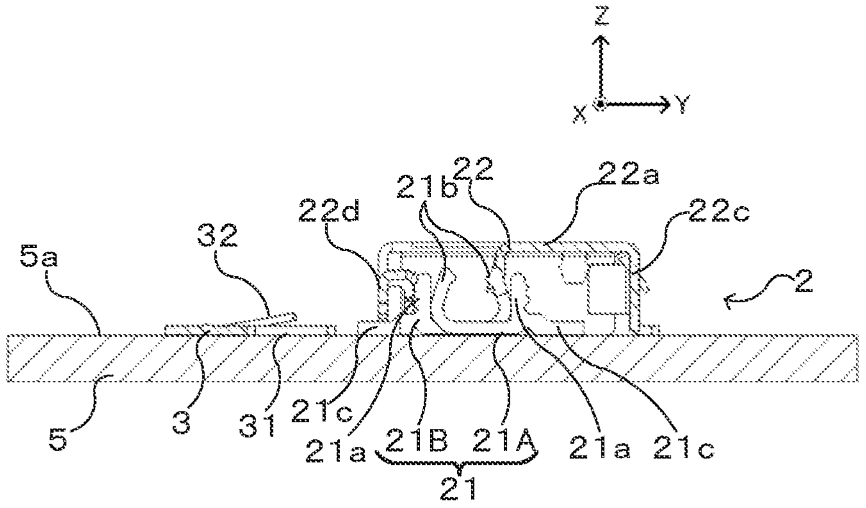
FIG. 9A is a cross-sectional view of the receptacle shell of the first connector excluding a housing taken along the line IX-IX in FIG. 1.
Figure 9B:
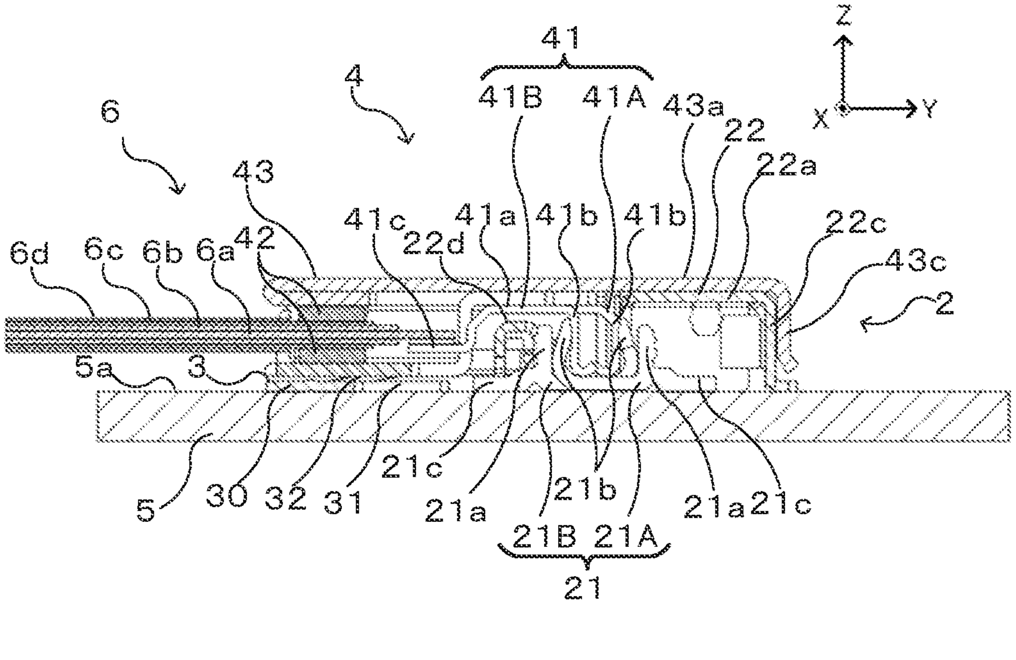
FIG. 9B is a cross-sectional view of the electrical connector device excluding housings taken along the line IX-IX in FIG. 1.

The side wall portion 22*c* is formed in such a manner as to be bent downward from an edge on the +Y side of the upper face portion 22*a* (see FIGS. 9A and 9B). The side wall portion 22*c* forms a side wall that is parallel with an XZ plane. As illustrated in FIGS. 5B and 5C, on a lower part of the side wall portion 22*c*, a plurality of board connecting portions 22*g* that is grounded to the mounting surface 5*a* of the board 5 (see FIG. 4) is formed. Each of both edges in the X-axis direction of the side wall portion 22*c* faces a +Y edge of one of the pair of side wall portions 22*b* with a slight gap interposed therebetween.

As illustrated in FIG. 4, the side wall portion 22*d* is formed in a shape in which members that are bent downward from edge portions on the −Y side of the extended portions 22*e* at both ends in the X-axis direction of the upper face portion 22*a* further extends in the X-axis direction and join to each other. The side wall portion 22*d* forms another side wall of the receptacle shell 22 that is parallel with the XZ plane. The upper face portion 22*a*, the extended portions 22*e*, and the side wall portion 22*d* form an edge portion of the opening that exposes the recessed portion 20*a* of the receptacle housing 20.

In addition, at both ends in the X-axis direction of and a center between the side wall portion 22*d*, the board connecting portions 22*g* that are connected to the board 5 are formed. Further, on the side wall portion 22*d*, notches are formed between the board connecting portions 22*g*. Under the notches, the second area 5*c* illustrated in FIG. 5A is formed and as illustrated in FIGS. 5B and 5C, the board connecting portions 21*c* of the second receptacle terminals 21B are arranged. In other words, the board connecting portions 21*c* of the second receptacle terminals 21B that are arranged in the second area 5*c* project toward the conductive member 3 from the receptacle shell 22. Note that although in the present embodiment, the second receptacle terminals 21B are disposed, the second receptacle terminals 21B do not have to be disposed. Even without disposing the second receptacle terminals 21B, electromagnetic shielding at the board connecting portions 21*c* of the first receptacle terminals 21A can be achieved. As described above, the receptacle shell 22 is only required to cover at least some receptacle terminals 21 (in the present embodiment, the first receptacle terminals 21A) among the plurality of receptacle terminals 21.

[Conductive Member]

Figure 6:
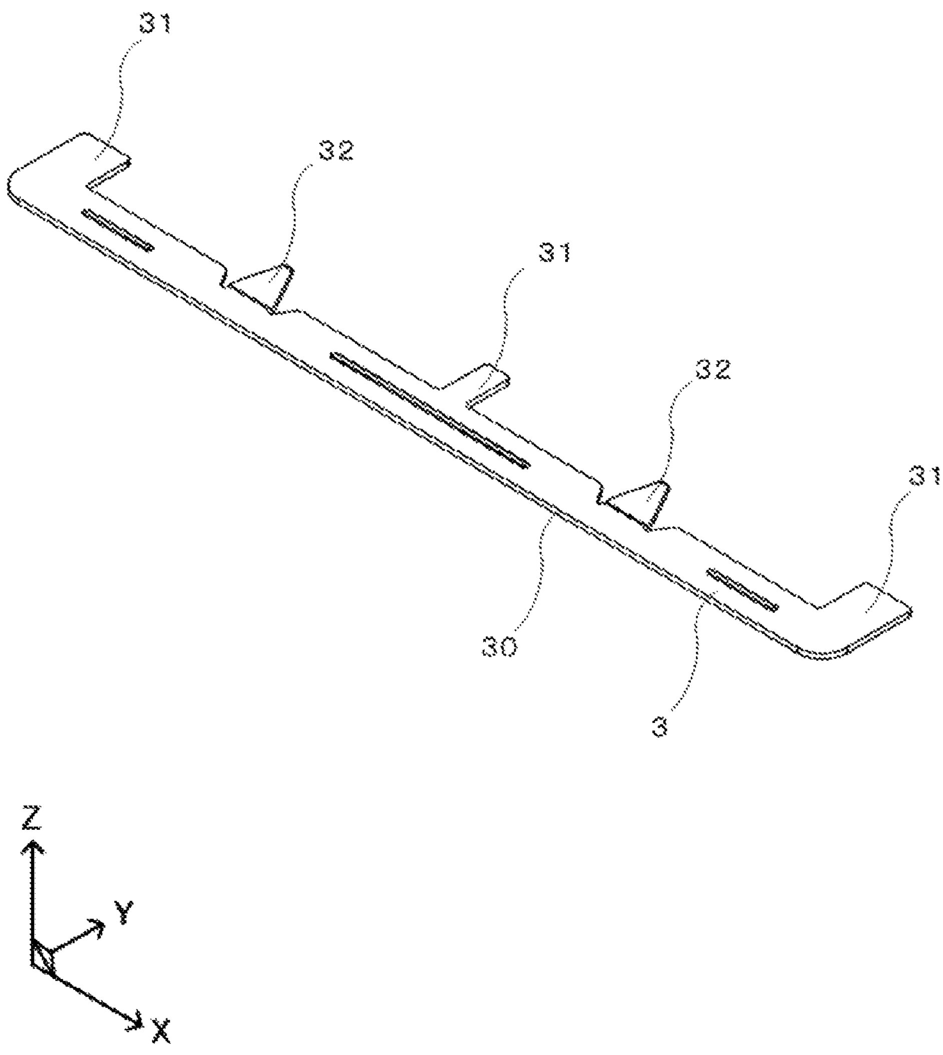
FIG. 6 is a perspective view of the conductive member.

Next, detailed configuration of the conductive member 3 is described. As illustrated in FIG. 6, the conductive member 3 is a flat plate-shaped member. The conductive member 3 includes a main body portion 30, three extended portions 31, and two contact projecting pieces 32.

The main body portion 30 is a plate-shaped portion that has a longitudinal direction aligned with the X-axis direction. Length in the X-axis direction of the main body portion 30 is the same as length in the X-axis direction of the receptacle shell 22. The extended portions 31 are plate-shaped portions that extend in a +Y direction from both ends and a central portion in the X-axis direction of the main body portion 30. Each of ends on the +Y side of the extended portions 31 that are arranged at both ends in the X-axis direction is arranged in such a manner as to face one of the board connecting portions 22*g* formed at bottom ends of both ends in the X-axis direction of the side wall portion 22*d* of the receptacle shell 22 with a minute gap interposed therebetween. Note that the extended portion 31 located at the central portion in the X-axis direction does not have to be formed.

As described above, in the present embodiment, the conductive member 3 is formed as a separate entity from the receptacle shell 22 and is separated from the receptacle shell 22 with a minute gap interposed therebetween. The extended portions 31 may be in contact with the board connecting portions 22*g* of the receptacle shell 22 without a gap and may be formed integrally with the receptacle shell 22.

The main body portion 30 and the extended portions 31 are formed along the mounting surface 5*a* of the board 5. The main body portion 30 and the extended portions 31, that is, the conductive member 3, and the pair of side wall portions 22*b* and the side wall portion 22*c* of the receptacle shell 22 are mounted in such a manner as to surround the receptacle terminals 21 as a whole in the mounting surface 5*a*.

Each of the contact projecting pieces 32 projects in a +Y-direction from the central position between the extended portions 31 on the main body portion 30. Each of the contact projecting pieces 32 is bent from the main body portion 30 and is inclined with respect to the horizontal plane in such a manner as to extend obliquely upward as extending in the +Y-direction. The contact projecting pieces 32 are formed to ensure electrical connection between the first connector 2 and the second connector 4 by coming into contact with a second shell 44 of the second connector 4 (see FIG. 7) when the first connector 2 and the second connector 4 are fitted to each other.

[Second Connector]

Figure 7:
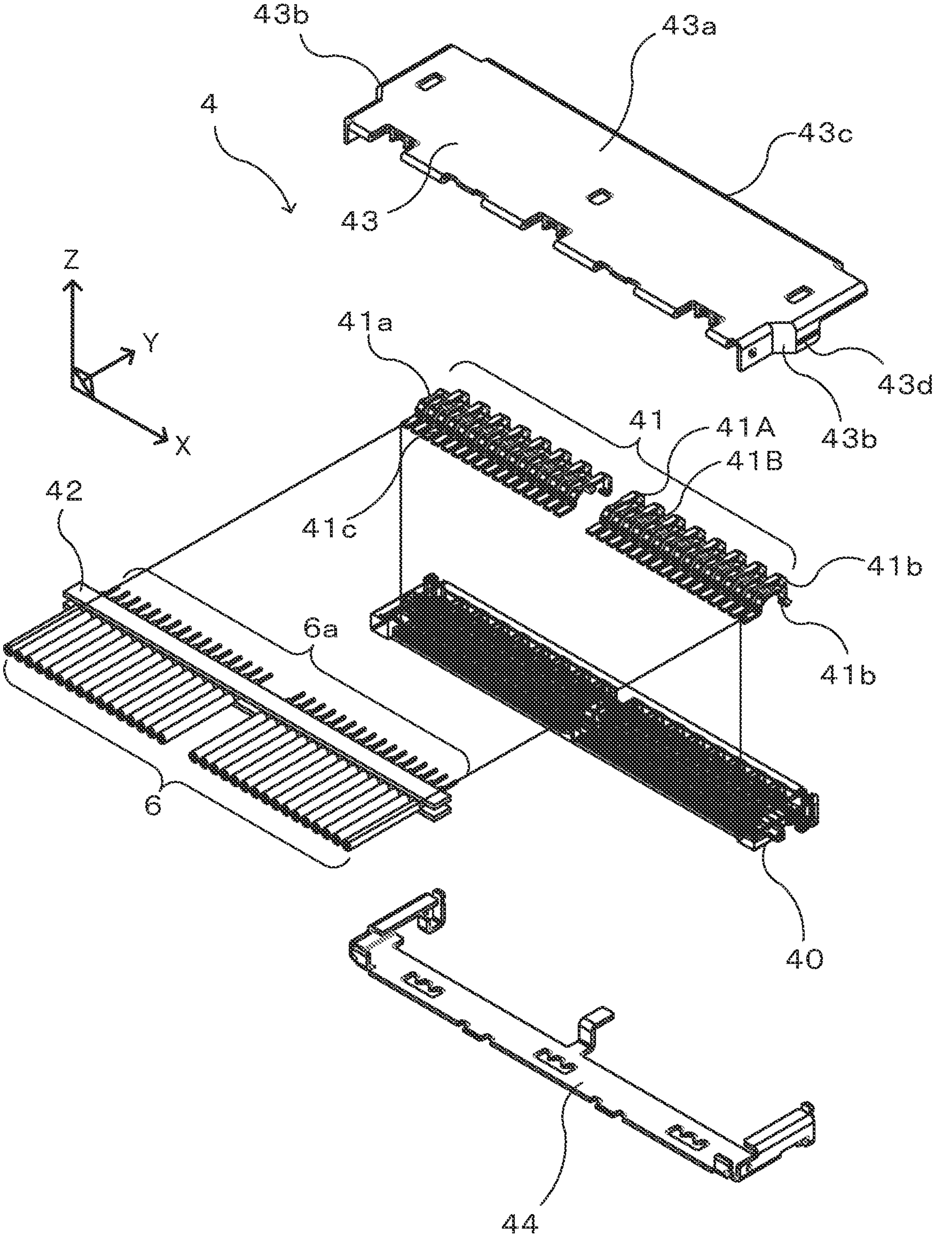
FIG. 7 is an exploded perspective view of the second connector (plug connector)

Next, detailed configuration of the second connector 4 is described. As illustrated in FIG. 7, the second connector 4 includes the plug housing 40, the plug terminals 41, a ground bar 42, a first shell 43, and the second shell 44. The first shell 43 and the second shell 44 constitute a plug shell.

[Plug Housing]

As illustrated in FIG. 7, the plug housing 40 forms a base of the second connector 4. The plug housing 40 has a rectangular outer shape and has a longitudinal direction aligned with the X-axis direction. The plug housing 40 is formed of an insulating material containing resin. The plug housing 40 holds a plurality of plug terminals 41 that is arranged in parallel with one another in the X-axis direction while being covered by the first shell 43. The plug housing 40 is interposed among the plug terminals 41 and the ground bar 42, the first shell 43, and the second shell 44 and insulates the plug terminals 41 from the ground bar 42, the first shell 43, and the second shell 44.

Figure 8:
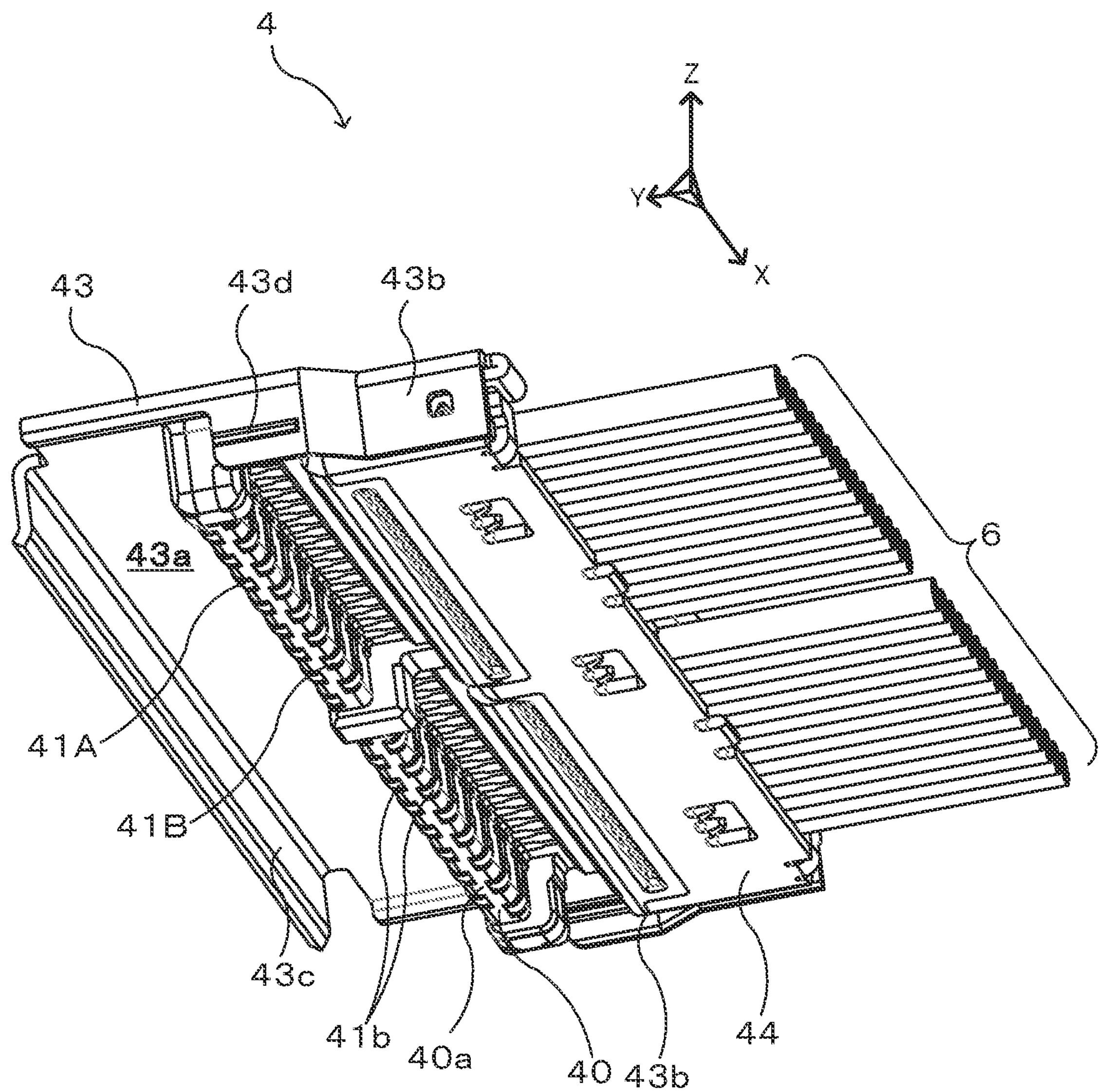
FIG. 8 is a perspective view of the second connector viewed from the bottom.

As illustrated in FIG. 8, on the lower surface facing in the −Z-direction of the plug housing 40, the protruding portion 40*a* that is fitted to the recessed portion 20*a* of the receptacle housing 20 of the first connector 2 (see FIG. 4) is formed. The protruding portion 40*a* protrudes downward (in the −Z-direction), and the protruding portion extends in the X-axis direction.

The plug housing 40 holds the plug terminals 41 in such a manner that the plug terminals 41 are arranged at the same pitch as that of the receptacle terminals 21. When the first connector 2 and the second connector 4 are fitted to each other, X-positions of the plug terminals 41 coincide with X-positions of the receptacle terminals 21.

[Plug Terminal]

The plurality of plug terminals 41 is, for example, conductive members that are formed by blanking a metal plate-shaped member having elastic force and further subjecting the blanked members to bending processing. As illustrated in FIG. 7, in each of the plug terminals 41, a fixing portion 41*a*, a contact portion 41*b*, and a cable connecting portion 41*c* are formed. The plug terminals 41 are arranged in a row in the X-axis direction. The fixing portion 41*a* of each of the plug terminals 41 is fixed to the plug housing 40 by being insert-molded or press-fitted into the plug housing 40.

In the second connector 4, first plug terminals 41A that come into contact with the first receptacle terminals 21A in a one-to-one manner when the second connector 4 is fitted to the first connector 2 and second plug terminals 41B that come into contact with the second receptacle terminals 21B in a one-to-one manner when the second connector 4 is fitted to the first connector 2 are disposed as the plug terminals 41. The first plug terminals 41A and the second plug terminals 41B are alternately arranged in the X-axis direction in the same order as the order in which the first receptacle terminals 21A and the second receptacle terminals 21B are arranged.

When each of the plug terminals 41 is fixed to the plug housing 40, the contact portion 41*b* of the plug terminal 41 serves as a portion of the outer surface of the protruding portion 40*a* of the plug housing 40, as illustrated in FIG. 8. As illustrated in FIG. 8, the contact portion 41*b* of each of the first plug terminals 41A is exposed on a −Y surface of the protruding portion 40*a*, and the contact portion 41*b* of each of the second plug terminals 41B is exposed on a +Y surface of the protruding portion 40*a*.

As illustrated in FIG. 9B, each of the plug terminals 41 has the cable connecting portion 41*c* connected to the inner conductor 6*a* of one of the electrical cables 6 by soldering. The plurality of plug terminals 41 is connected to the plurality of electrical cables 6 in a one-to-one manner.

[Ground Bar]

The ground bar 42 is a pair of conductive plate-shaped members that extend in the X-axis direction. The ground bar 42 clamps the electrical cables 6 at portions where the outer conductors 6*c* (see FIG. 3) of the electrical cables 6 are exposed, as illustrated in FIG. 7. As illustrated in FIG. 9B, the ground bar 42 is clamped by the first shell 43 and the second shell 44 and is electrically connected to the first shell 43 and the second shell 44 by solder connection.

[First Shell]

The first shell 43 is, for example, formed by a pressed metal plate-shaped member and has elasticity and conductivity. As illustrated in FIG. 7, the first shell 43 includes an upper face portion 43*a*, a pair of side wall portions 43*b*, and a side wall portion 43*c*.

As illustrated in FIGS. 7 and 8, the upper face portion 43*a* is a flat plate-shaped portion that is parallel with the XY plane in such a manner as to cover the upper surface of the plug housing 40. The pair of side wall portions 43*b* are formed in such a manner as to be bent downward from edges at both ends in the X-axis direction of the upper face portion 43*a*. Each of the side wall portions 43*b* forms a side wall that is parallel with the YZ plane. In a space surrounded by the upper face portion 43*a* and the pair of side wall portions 43*b*, the plug housing 40 is arranged. The pair of side wall portions 43*b* cover side walls at both ends in the X-axis direction of the plug housing 40. On each of the side wall portions 43*b*, a protrusion-shaped second engagement portion 43*d* that engages with one of the recess-shaped first engagement portions 22*f* (see FIG. 4) of the first connector 2 is formed. Note that when the first engagement portions 22*f* are formed in a protruding shape, the second engagement portions 43*d* are formed in a recessed shape.

As illustrated in FIG. 8, the upper face portion 43*a* largely projects in a +Y-direction from the first connector 2 toward the conductive member 3 beyond the plug housing 40 and is formed in a size that enables the entire first connector 2 and conductive member 3 to be covered.

As illustrated in FIG. 8, the side wall portion 43*c* is formed in such a manner as to be bent downward from an edge on the +Y side of the upper face portion 43*a*. The side wall portion 43*c* forms a side wall that is parallel with the XZ plane.

The first shell 43 covers an outer periphery of the plug housing 40 while being insulated from the plug terminals 41. The first shell 43 cuts off electromagnetic waves generated from the plug terminals 41 and prevents the electromagnetic waves from leaking to the outside. The first shell 43 is only required to cover at least some plug terminals 41 among the plurality of plug terminals 41.

[Second Shell]

As illustrated in FIG. 7, the second shell 44 is, for example, formed by a pressed metal plate-shaped member and has elasticity and conductivity. As illustrated in FIG. 8, the second shell 44 is insert-molded into the inside of the plug housing 40 while being insulated from the plug terminals 41. The second shell 44 forms a portion of a lower surface of the second connector 4.

The plurality of electrical cables 6 is connected to the plug terminals 41 and the ground bar 42 that are held by the plug housing 40 integrated with the second shell 44. The first shell 43 covering the upper surfaces of the above-described constituent elements and the second shell 44 covering the lower surfaces of the constituent elements cause the second connector 4 to be formed.

The second shell 44 serves as a cover surrounding tip portions of the electrical cables 6 and the plug terminals 41 in conjunction with the first shell 43. Because of this configuration, electromagnetic waves are prevented from leaking to the outside from the tip portions of the electrical cables 6 and the plug terminals 41 or being mixed into the tip portions of the electrical cables 6 and the plug terminals 41 from the outside. The ground bar 42 connected to the electrical cables 6 functions as a portion of the cover.

[Fitting between First Connector and Second Connector]

In FIG. 9A, a cross-sectional view of the first connector 2 mounted on the board 5 is illustrated with illustration of the receptacle housing 20 omitted. In FIG. 9B, a cross-sectional view of the first connector 2 and the second connector 4 is illustrated with illustration of the receptacle housing 20 and the plug housing 40 omitted.

As illustrated in FIG. 9A, the first connector 2 is mounted on the board 5. While the first connector 2 is in this state, the second connector 4 is positioned over the first connector 2 and the conductive member 3 in such a direction that the tips of the electrical cables 6 are located over the conductive member 3, as illustrated in FIG. 9B. By fitting the recessed portion 20*a* of the receptacle housing 20 of the first connector 2 (see FIG. 4) and the protruding portion 40*a* of the plug housing 40 of the second connector 4 (see FIG. 8) to each other, the first connector 2 and the second connector 4 are connected to each other.

While the first connector 2 and the second connector 4 are in this state, the first engagement portions 22*f* of the receptacle shell 22 and the second engagement portions 43*d* of the first shell 43 are engaged with each other, and connection between the first connector 2 and the second connector 4 is solidified. While the first connector 2 and the second connector 4 are in this state, the second shell 44 of the second connector 4 comes into contact with the contact projecting pieces 32 of the conductive member 3, and elastic force of the contact projecting pieces 32 causes the conductive member 3 and the second shell 44 to come into electrical contact with each other more solidly.

When the first connector 2 and the second connector 4 are fitted to each other in this way, the inner conductors 6*a* of the electrical cables 6, the plug terminals 41 (plug terminals 41A and 41B) of the second connector 4, the receptacle terminals 21 (receptacle terminals 21A and 21B) of the first connector 2, and the signal electrodes of the board 5 come into contact with each other, as illustrated in FIG. 9B, and the contact between the foregoing elements causes a transmission line of signals between the electrical cables 6 and the board 5 to be formed.

On the other hand, when the first connector 2 and the second connector 4 are fitted to each other as described above, a transmission line for grounding passing through the outer conductors 6*c* of the electrical cables 6, the ground bar 42, the first shell 43 and the second shell 44, the receptacle shell 22, and the ground electrodes of the board 5 is formed, as illustrated in FIG. 9B. Voltage signals are transmitted via the transmission line of signals and the transmission line for grounding.

When the first connector 2 is in a state illustrated in FIG. 9A, a portion of the surroundings of the receptacle terminals 21 is surrounded by the receptacle shell 22 and the conductive member 3. The conductive member 3 is arranged in such a manner as to surround the facing area FA (see FIG. 5A), which faces the second connector 4 to be fitted to the first connector 2, within the mounting surface 5*a* of the board 5 in conjunction with the receptacle shell 22 along the mounting surface 5*a*. However, although the second receptacle terminals 21B, in particular portions close to the board connecting portions 21*c* of the second receptacle terminals 21B, are surrounded by the conductive member 3 within the mounting surface 5*a* of the board 5, no member that surrounds the receptacle terminals 21 in conjunction with the receptacle shell 22 is disposed over the conductive member 3.

As illustrated in FIG. 9B, when the first connector 2 and the second connector 4 are fitted to each other, the plug shell including the first shell 43 and second shell 44 of the second connector 4 covers a portion that is not covered by the receptacle shell 22. As described before, since the plug shell is in contact with the receptacle shell 22 and the conductive member 3, the plug shell functions as an electromagnetic shield for the above-described transmission line of signals in conjunction with the receptacle shell 22 and the conductive member 3. That is, the plug shell of the second connector 4 is arranged in such a manner as to, when being fitted to the first connector 2, come into contact with the receptacle shell 22 and the conductive member 3 and cover the receptacle terminals 21 in conjunction with the receptacle shell 22 and the conductive member 3. More specifically, the plug shell (including the first shell 43 and the second shell 44) is arranged in such a manner as to come into contact with the receptacle shell 22 and also project toward the conductive member 3 and come into contact with the conductive member 3, and thereby cover the receptacle terminals 21 in conjunction with the receptacle shell 22 and the conductive member 3, as illustrated in FIG. 9B.

Note that the ground bar 42 is formed at a portion where the electrical cables 6 are inserted and the ground bar 42 also acts as an electromagnetic shield in conjunction with the receptacle shell 22, the first shell 43, and the conductive member 3.

As described above, the first connector 2 includes the conductive receptacle terminals 21 to, when the first connector 2 and the second connector 4 are fitted to each other, electrically connect to the electrical cables 6 via the second connector 4 and the conductive receptacle shell 22 grounded to the board 5 and configured to cover portions of the receptacle terminals 21.

In addition, the second connector 4 includes the conductive plug shell (including the first shell 43 and the second shell 44) that is arranged in such a manner as to, when being fitted to the first connector 2, come into contact with the receptacle shell 22 and the conductive member 3 and cover the receptacle terminals 21 in conjunction with the receptacle shell 22 and the conductive member 3.

Note that as illustrated in FIG. 9B, a main portion having the receptacle housing 20 as a base in the first connector 2 and a main portion having the plug housing 40 as a base in the second connector 4 do not overlap each other in the Z-axis direction but are arranged along the XY plane. The main portion of the second connector 4 is arranged over the conductive member 3. This configuration enables a reduction in height of the electrical connector device 1 to be achieved.

As described in the foregoing in detail, according to the electrical connector device 1 according to the present embodiment, since the entire board connecting portions 21*c* of the receptacle terminals 21 can be covered by the receptacle terminals 21, the receptacle shell 22 of the first connector 2, the conductive member 3, and the plug shell (including the first shell 43 and the second shell 44) of the second connector 4, it is possible to achieve electromagnetic shielding at the board connecting portions 21*c* of the receptacle terminals 21.

In the present embodiment, the conductive member 3 is formed as a separate entity from the receptacle shell 22. Because of this configuration, deformation of the conductive member 3 can be prevented better than by extending the receptacle shell 22 and thereby forming the conductive member 3. In addition, since separating a functional unit into individual components enables complexity of components to be avoided, precision of each component can be improved. Further, it becomes easy to inspect positions facing the mounting surface 5*a* of the board 5 on the board connecting portions 21*c* of the receptacle terminals 21 or the board connecting portions 22*g* of the receptacle shell 22.

In addition, in the present embodiment, the contact projecting pieces 32 that when the first connector 2 and the second connector 4 are fitted to each other, come into contact with the second shell 44 and generate an elastic force are formed on the conductive member 3. Because of this configuration, electrical connection between the first connector 2 and the second connector 4 can be solidified.

In addition, in the present embodiment, as the receptacle terminals 21, the first receptacle terminals 21A that have the board connecting portions 21*c* located in the first area 5*b* on the mounting surface 5*a* of the board 5 and the second receptacle terminals 21B that have the board connecting portions 21*c* located in the second area 5*c* on the mounting surface 5*a* of the board 5 are included. The receptacle shell 22 is arranged close to the first area 5*b*, and the conductive member 3 is arranged close to the second area 5*c*. When configured in such a manner, not only does a degree of freedom of arrangement of the receptacle terminals 21 and the plug terminals 41 increase, but also high-density mounting can be achieved.

Needless to say, the receptacle terminals 21 and the plug terminals 41 may be arranged in such a manner that terminals having the same shape are arranged in a row in the same direction. That is, the board connecting portions 21*c* of all the first receptacle terminals 21A and the second receptacle terminals 21B may be positioned in the first area 5*b* or positioned in the second area 5*c* within the mounting surface 5*a* of the board 5.

In addition, according to the present embodiment, the first engagement portions 22*f* are formed on the receptacle shell 22, and the second engagement portions 43*d* each of which engages with one of the first engagement portions 22*f* when the first connector 2 and the second connector 4 are fitted to each other are formed on the first shell 43. When configured in such a manner, physical connection between the first connector 2 and the second connector 4 can be solidified.

Note that the shapes of the first engagement portions 22*f* and the second engagement portions 43*d* are not particularly limited to the shapes in the above-described embodiment. The first engagement portions 22*f* and the second engagement portions 43*d* are only required to be able to be locked to each other.

Note that although according to the present embodiment, the first shell 43 and the second shell 44 constitute the plug shell, the plug shell may be formed by either of the components.

Note that it may be configured such that a differential signal is transmitted by a pair of adjacent electrical cables 6 In addition, an electrical cable 6 between a pair of electrical cables 6 and another pair of electrical cables 6 may be an electrical cable 6 for grounding. In addition, the electrical cables 6 may be a shielded wire other than a coaxial cable.

In addition, in the present embodiment, it is assumed that the electrical cables 6 extend in parallel with the XY plane. However, the present disclosure is not limited to the configuration. The electrical cables 6 may extend in the normal direction or may extend in a direction inclined with respect to the XY plane.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure can be applied to an electromagnetic shield of a connector that interconnects boards.

1 Electrical connector device
2 First connector (receptacle connector)
3 Conductive member
4 Second connector (plug connector)
5 Board
5*a* Mounting surface
5*b* First area
5*c* Second area
6 Electrical cable (signal line)
6*a* Inner conductor
6*b* Insulator
6*c* Outer conductor
6*d* Protective film
20 Receptacle housing
20*a* Recessed portion
20*b* Through-hole
20*c* Groove portion
21 Receptacle terminal
21A First receptacle terminal
21B Second receptacle terminal
21*a* Locking portion
21*b* Contact portion
21*c* Board connecting portion
22 Receptacle shell
22*a* Upper face portion
22*b*, 22*c*, 22*d* Side wall portion
22*e* Extended portion
22*f* First engagement portion
22*g* Board connecting portion
30 Main body portion
31 Extended portion
32 Contact projecting piece
40 Plug housing
40*a* Protruding portion
41 Plug terminal
41A First plug terminal
41B Second plug terminal
41*a* Fixing portion
41*b* Contact portion
41*c* Cable connecting portion
42 Ground bar
43 First shell
43*a* Upper face portion
43*b*, 43*c* Side wall portion
43*d* Second engagement portion
44 Second shell
FA Facing area

What is claimed is:

1. An electrical connector device, comprising:
a first connector mounted on a board;
a conductive member grounded to the board; and
a second connector connected to a signal line and configured to, when being fitted to the first connector, electrically connect the signal line and the board to each other, wherein
the first connector includes:
a plurality of conductive receptacle terminals each including a board connecting portion to electrically connect to the board and configured to, when the first connector and the second connector are fitted to each other, electrically connect to the signal line via the second connector; and
a conductive receptacle shell grounded to the board and configured to cover at least some receptacle terminals among the plurality of receptacle terminals,
the conductive member is arranged in such a manner as to surround a facing area, the facing area facing the second connector to be fitted to the first connector, within a mounting surface of the board along the mounting surface in conjunction with the receptacle shell, and
the second connector includes a conductive plug shell arranged in such a manner as to, when being fitted to the first connector, come into contact with the receptacle shell and the conductive member and cover the receptacle terminals in conjunction with the receptacle shell and the conductive member.

2. The electrical connector device according to claim 1, wherein the conductive member is formed as a separate entity from the receptacle shell.

3. The electrical connector device according to claim 1, wherein a contact projecting piece that when the first connector and the second connector are fitted to each other, come into contact with the plug shell is formed on the conductive member.

4. The electrical connector device according to claim 1, comprising, as the receptacle terminals:

a first receptacle terminal having the board connecting portion arranged in a first area within the facing area; and a second receptacle terminal having the board connecting portion arranged in a second area different from the first area within the facing area, wherein the receptacle shell is arranged close to the first area, and the conductive member is arranged close to the second area.

5. The electrical connector device according to claim 4, wherein the board connecting portion of the second receptacle terminal that is arranged in the second area projects toward the conductive member from the receptacle shell.

6. The electrical connector device according to claim 1, wherein a first engagement portion is formed on the receptacle shell, and a second engagement portion that engages with the first engagement portion when the first connector and the second connector are fitted to each other is formed on the plug shell.

7. A receptacle connector fitted to a plug connector including:

a plurality of conductive plug terminals connected to a plurality of signal lines in a one-to-one manner; and a conductive plug shell to cover at least some plug terminals among the plurality of plug terminals, the receptacle connector comprising:

a plurality of conductive receptacle terminals each including a board connecting portion to electrically connect to a board;

a conductive receptacle shell to cover at least some receptacle terminals among the plurality of receptacle terminals, the receptacle shell being grounded to the board; and a conductive member grounded to the board and arranged in such a manner as to surround a facing area, the facing area facing the plug connector to be fitted to the receptacle connector, within a mounting surface of the board along the mounting surface in conjunction with the receptacle shell, wherein when the receptacle connector is fitted to the plug connector, the receptacle terminals come into contact with the plug terminals in a one-to-one manner, and the receptacle shell and the conductive member are arranged in such a manner as to come into contact with the plug shell and cover the board connecting portions in conjunction with the plug shell.

8. The receptacle connector according to claim 7, comprising, as the receptacle terminals:

a first receptacle terminal having the board connecting portion arranged in a first area within the facing area; and a second receptacle terminal having the board connecting portion arranged in a second area different from the first area within the facing area, wherein the receptacle shell is arranged close to the first area, the conductive member is arranged close to the second area, and the board connecting portion of the second receptacle terminal that is arranged in the second area projects toward the conductive member from the receptacle shell.

9. A plug connector fitted to a receptacle connector including:

a plurality of conductive receptacle terminals each including a board connecting portion to electrically connect to a board;

a conductive receptacle shell grounded to the board and configured to cover at least some receptacle terminals among the plurality of receptacle terminals; and a conductive member grounded to the board and mounted in adjacency to the receptacle shell, the plug connector comprising:

a plurality of conductive plug terminals connected to a plurality of signal lines in a one-to-one manner; and a conductive plug shell to cover at least some plug terminals among the plurality of plug terminals, wherein when the receptacle connector is fitted to the plug connector, the plug terminals come into contact with the receptacle terminals in a one-to-one manner, and the plug shell is arranged in such a manner as to come into contact with the receptacle shell, project toward the conductive member and come into contact with the conductive member, and cover the receptacle terminals in conjunction with the receptacle shell and the conductive member.

* * * * *